United States Patent
Pitts

(10) Patent No.: US 12,293,483 B2
(45) Date of Patent: May 6, 2025

(54) WIDE-ANGLE CAMERA

(71) Applicant: Google LLC, Mountain View, CA (US)

(72) Inventor: Colvin Pitts, Snohomish, WA (US)

(73) Assignee: GOOGLE LLC, Mountain View, CA (US)

(*) Notice: Subject to any disclaimer, the term of this patent is extended or adjusted under 35 U.S.C. 154(b) by 437 days.

(21) Appl. No.: 17/437,576

(22) PCT Filed: Mar. 10, 2019

(86) PCT No.: PCT/US2019/021516
§ 371 (c)(1),
(2) Date: Sep. 9, 2021

(87) PCT Pub. No.: WO2020/185201
PCT Pub. Date: Sep. 17, 2020

(65) Prior Publication Data
US 2022/0198605 A1    Jun. 23, 2022

(51) Int. Cl.
*G06T 3/047* (2024.01)
*G06T 3/4038* (2024.01)
*G06T 5/50* (2006.01)

(52) U.S. Cl.
CPC ............ *G06T 3/4038* (2013.01); *G06T 3/047* (2024.01); *G06T 5/50* (2013.01)

(58) Field of Classification Search
CPC ....... G06T 3/4038; G06T 3/0018; G06T 5/50; G06T 3/40
See application file for complete search history.

(56) References Cited

U.S. PATENT DOCUMENTS 9,052,571 B1* 6/2015 Lapstun ................. G06T 3/4038
2009/0208136 A1* 8/2009 Kawasaki .............. H04N 23/81
382/293
(Continued)

FOREIGN PATENT DOCUMENTS

CN     108846796 A    11/2018
CN     109361912 A     2/2019
(Continued)

OTHER PUBLICATIONS

Tuan Ho, Madhukar Budagavi, Dual-Fisheye Lens Stitching for 360-Degree Imaging, Aug. 20, 2017 (Year: 2017).*
(Continued)

*Primary Examiner* — Amandeep Saini
*Assistant Examiner* — Mehrazul Islam
(74) *Attorney, Agent, or Firm* — Brake Hughes Bellermann LLP

(57) ABSTRACT

Devices and methods related to capturing 360 degree spherical images are provided. A computing device can capture, substantially simultaneously, a first image with the first image sensor and a second image with a second image sensor. The first image sensor can be positioned on a first side of the computing device and oriented at a first orientation with respect to an axis of rotation. The second image sensor can be positioned on a second side of the device substantially opposite the first side of the device and oriented at a second orientation that is axially rotated from the first orientation with respect to the axis of rotation. The computing device can stitch together the first image and the second image to create an output image that captures a 360 degree field of view with respect to the computing device.

16 Claims, 11 Drawing Sheets

(56) References Cited

U.S. PATENT DOCUMENTS

| | | | |
|---|---|---|---|
| 2017/0046820 A1* | 2/2017 | Steel | G06T 3/073 |
| 2017/0287107 A1* | 10/2017 | Forutanpour | G06T 3/047 |
| 2018/0035047 A1* | 2/2018 | Lei | G06T 3/0018 |
| 2018/0101931 A1 | 4/2018 | Abbas et al. | |
| 2018/0205934 A1* | 7/2018 | Abbas | H04N 23/698 |
| 2018/0286026 A1 | 10/2018 | Fan et al. | |
| 2019/0014260 A1* | 1/2019 | Mu | G06T 3/0093 |
| 2019/0167081 A1* | 6/2019 | Hillman | A61B 1/00197 |
| 2019/0172227 A1* | 6/2019 | Kasahara | H04N 23/683 |
| 2019/0230283 A1* | 7/2019 | Ollier | H04N 23/667 |

FOREIGN PATENT DOCUMENTS

| | | |
|---|---|---|
| JP | 2013118518 A | 6/2013 |
| KR | 20150084807 A | 7/2015 |
| KR | 101915729 B1 | 11/2018 |
| WO | 2014076402 A1 | 5/2014 |
| WO | 2017118498 A1 | 7/2017 |

OTHER PUBLICATIONS

Office Action for Korean Patent Application No. 10-2021-7028201 dated Jan. 25, 2023. 6 pages.

Brown, et al., "Automatic Panoramic Image Stitching using Invariant Features", International Journal of Computer Vision, vol. 74(1), Dec. 16, 2007, pp. 59-73.

Fangi, et al., "Photogrammetric Processing of Spherical Panoramas", The Photogrammetric Record, vol. 28, No. 143, Sep. 2013, pp. 293-311.

Ma, "Study of Stitching Technologies of 360° Panoramic Image", English Abstract of Chinese Master's Dissertations Full-Text Database (Information Technology Series), Apr. 15, 2013, 88 pages.

Tang, "Study of Key Technologies of Spherical Panoramic System", English Abstract of Chinese Master's Dissertations Full-Text Database (Information Technology Series), Jan. 15, 2019, 69 pages.

* cited by examiner

900

910 Capturing, substantially simultaneously, a first image with a first image sensor of a computing device and a second image with a second image sensor of the computing device, wherein the first image sensor is positioned on a first side of the computing device and is oriented at a first orientation with respect to an axis of rotation, and wherein the second image sensor is positioned on a second side of the computing device substantially opposite the first side of the computing device and is oriented at a second orientation that is axially rotated from the first orientation with respect to the axis of rotation 920 Stitching, using the computing device, the first image and the second image to create an output image that captures a 360 degree field of view with respect to the computing device

FIG. 9

WIDE-ANGLE CAMERA

CROSS-REFERENCE TO RELATED APPLICATIONS

The present application is a national phase entry under 35 U.S.C. § 371 of International Application No. PCT/US2019/021516 filed Mar. 10, 2019, incorporated herein by reference.

BACKGROUND

Many types of camera systems can capture wide-angle images, such as 360 degree spherical images. Such spherical images can be used in augmented reality (AR) and virtual reality (VR) technologies. Additionally, 360 degree spherical images can be useful for artificial intelligence tasks, like semantic environment understanding and training machine learning systems.

A typical cheap, simple, and common 360 degree spherical camera device utilizes two cameras with "fisheye" lenses placed on substantially opposites sides of the camera device. Each camera can be configured to capture slightly more than a 180 degree hemisphere on each side of the device. The resulting two images can then be "stitched" together with the final result being a 360 degree spherical image and/or a flat, panoramic image that displays an entire 360 degree view around the camera device.

SUMMARY

In one aspect, a device is provided. The device includes a first image sensor positioned on a first side of the device, where the first image sensor is oriented at a first orientation with respect to an axis of rotation. The device also includes a second image sensor positioned on a second side of the device substantially opposite the first side of the device, where the second image sensor is oriented at a second orientation that is axially rotated from the first orientation with respect to the axis of rotation. The device further includes a processor configured to perform functions. These functions include: capturing, substantially simultaneously, a first image with the first image sensor and a second image with the second image sensor, and stitching together the first image and the second image to create an output image that captures a 360 degree field of view with respect to the device.

In another aspect, a method is provided. A computing device captures, substantially simultaneously, a first image with a first image sensor and a second image with a second image sensor of the computing device. The first image sensor is positioned on a first side of the computing device and is oriented at a first orientation with respect to an axis of rotation and the second image sensor is positioned on a second side of the computing device substantially opposite the first side of the computing device and is oriented at a second orientation that is axially rotated from the first orientation with respect to the axis of rotation. The computing device stitches the first image and the second image to create an output image that captures a 360 degree field of view with respect to the computing device.

In another aspect, a device is provided. The device includes: first image sensing means positioned on a first side of the device and oriented at a first orientation with respect to an axis of rotation. The device also includes: second image sensing means positioned on a second side of the device substantially opposite the first side of the device and oriented at a second orientation that is axially rotated from the first orientation with respect to the axis of rotation. Further, the device includes processor means configured to capture, substantially simultaneously, a first image with the first image sensor and a second image with the second image sensor, and stitch together the first image and the second image to create an output image that captures a 360 degree field of view with respect to the device.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 9 is a flowchart of a method, in accordance with some example embodiments.

DETAILED DESCRIPTION

Figure 1:
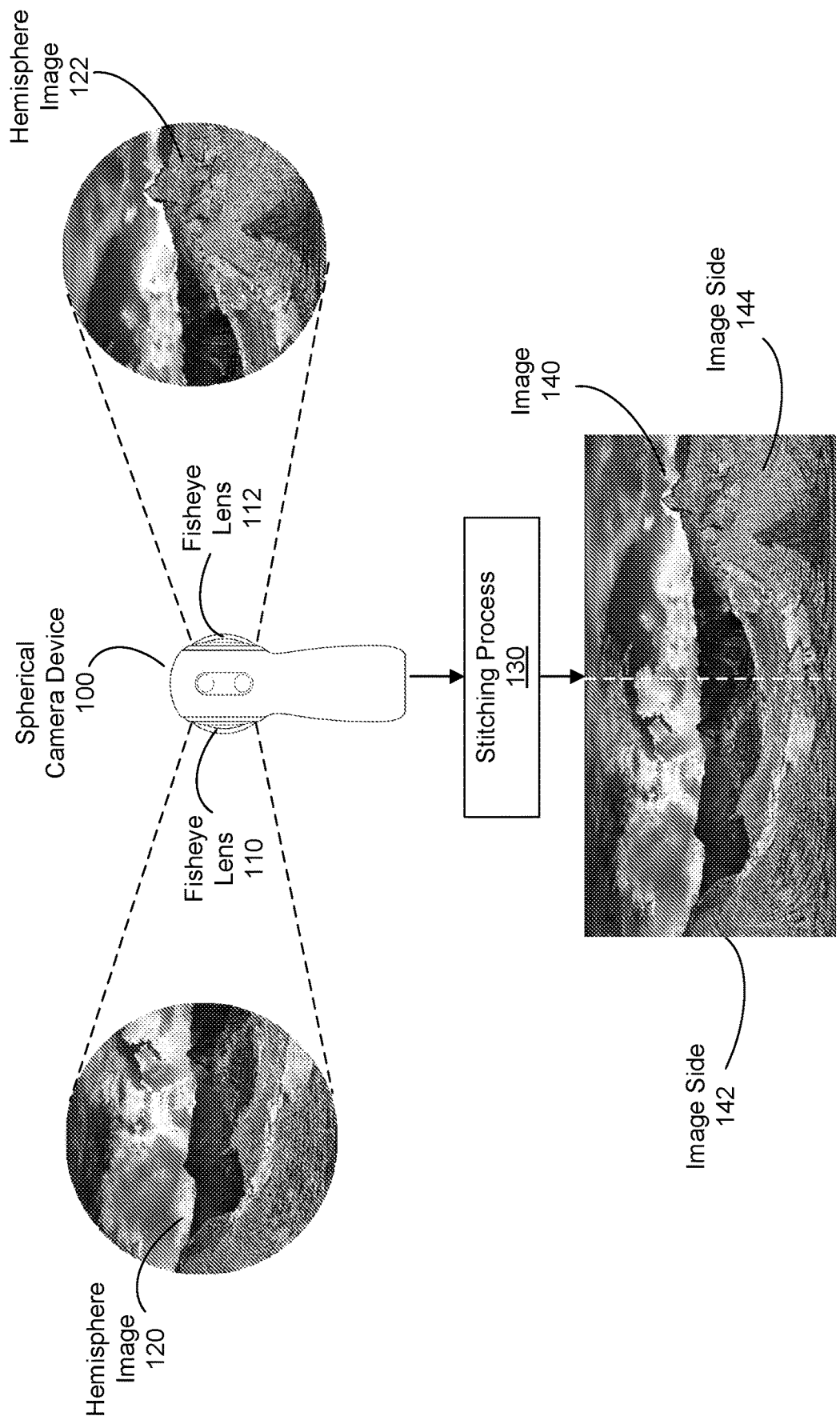
FIG. 1 is a diagram illustrating a spherical camera device, in accordance with some example embodiments.

Many types of camera systems can capture 360 degree spherical images. As an example, a simple 360 degree spherical camera device may utilize two cameras with "fisheye" lenses (ultra-wide-angle lens that produce barrel distortions). Both cameras can be placed on substantially opposite sides of the camera device. During operation, each camera can simultaneously capture hemispheric images with fields of view of 180 degrees or greater on each side of the device. The resulting two images can then be "stitched" together with software embedded into the camera device or on a remote server, with the final result being a 360 degree spherical image and/or a flat, panoramic image that displays an entire 360 degree view around the camera device. Notably, the term "360 degree" as used herein can refer to the set of degrees that are at, or substantially near 360 degrees. For example, 360 degree spherical image can encompass 359.99 degree spherical images.

A significant challenge for the two camera 360 degree spherical camera device can be image quality. Given that typical camera devices have rectangularly shaped image sensors, each fisheye lens may have an image circle that is inscribed within the rectangularly shaped image sensors.

This configuration can ensure that each fisheye lens captures an entire hemisphere of an environment being captured by the 360 degree spherical camera device. However, as a result, a large portion of pixels of the rectangular sensor may be unused by the fisheye lens. In some examples, pixel utilization with a fisheye lens can be as low as 51%-58% with respect to the active area of a rectangular sensor. For a 12 megapixel (MP) rectangular image sensor, this means that approximately 5 to 6 MP of sensor resolution can be completely wasted.

Current approaches to address low pixel utilization can rely on customized image sensors and/or other hardware devices. While customized image sensors may work in highly specialized use cases, these approaches can be expensive and unrealistic for mass produced camera devices, which often rely on common image sensors and hardware. Additionally, approaches that use alternative types of 360 degree spherical camera devices (e.g., devices that use 3, 4, or 5 cameras that each capture a unique view) face similar problems of high manufacturing costs when compared to two camera 360 degree camera systems. Thus, a solution involving a two camera, 360 degree spherical camera devices with common image sensors and/or other hardware may be preferred.

Accordingly, the herein described techniques and devices relate to a 360 degree spherical camera device that can achieve high pixel utilization and image quality. The device described can include two camera modules that record image and/or video data and a method to join or stitch the captured data. The camera modules can face in substantially opposite directions on the device. Notably, as used herein, the term 'substantially' can mean being largely, but not wholly of what is specified. For example, 'substantially opposite' camera modules can be placed back to back or the camera modules can be placed on opposite sides of the device with a relative offset to reduce overall width of the device. Each camera module can consist of a lens, image sensor, and circuitry to read the image and/or video data. The image sensor may be a rectangular sensor, including square, of dimensions W pixels×H pixels.

In example embodiments, the lens for each camera module may have a field of view greater than or equal to 180 degrees and can generate an image circle that is larger than the image sensor. As a result, each camera module may have regions, herein referred to as "gaps", which go uncaptured by the image sensor. To avoid or at least minimize these gaps, the camera modules can be rotated relative to each other around the optical axis. In the case of image sensors with a non-square aspect ratio (e.g., 4:3), the relative rotation may be +/−90 degrees. In the case of image sensors with a square (e.g., 1:1) aspect ratio, or substantially so, the rotation may be approximately +/−45 degrees.

Each camera module can capture additional pixel regions beyond a 180 degree field of view that are herein referred to as "overflow pixels". The relative rotation between camera modules can allow one camera module's overflow pixels to fill the opposite camera module's gaps. For example, one camera module can capture overflow pixels on the left and right sides of the camera device, while having gaps on the top and bottom sides. Due to the rotation, the opposite camera can capture overflow pixels on the top and bottom sides of the camera device, while having gaps on the left and right sides. When images from both camera modules are stitched together, the resulting 360 degree image can have no uncaptured regions within the 360 degree field of view around the camera device while simultaneously achieving high pixel utilization. The image stitching technique disclosed herein can be referred to as "baseball stitching", because the "wrap around" effect each lens can similarly resemble the stitching pattern of a baseball.

By way of example, given a hypothetical 360 degree spherical camera device comprised of two sensors, each 4000×3000 pixels, a standard approach using 180 degree lenses may use 14.1 of the total 24 megapixels and may have an angular resolution of 16.7 pixels per degree (e.g., 16.7 pixels are used to capture each degree of an environment being photographed by the 360 degree spherical camera device). In a baseball stitching approach, the lenses may each have a 205 degree field of view and the 360 degree spherical camera device can effectively use 19.6 of the total 24 megapixels and may have an angular resolution of 19.5 pixels per degree. Since higher angular resolution corresponds to more pixels used to capture each section of an image, the baseball stitching approach can result in better image resolution.

The herein described techniques may help provide a flexible and efficient approach for generating 360 degree images from multiple input images. By capturing images with image sensors having different offset orientations, the herein-described baseball stitching methods can form 360 degree images with high pixel utilization while still utilizing common image sensors. As such, the herein-described techniques can enhance the performance of augmented reality (AR) systems, virtual reality (VR) systems, or artificial intelligence systems by enabling high quality images that can be captured using camera devices with common components. Notably, while the examples and embodiments herein relate to a two camera approach for a 360 degree spherical camera device, the baseball stitching techniques can be extrapolated and included in 360 degree spherical camera devices that use 3, 4, 5 or more cameras.

Example Camera Devices

FIG. 1 is a diagram illustrating spherical camera device 100, in accordance with some example embodiments. As described, spherical camera device 100 can be configured with fisheye lens 110 and fisheye lens 112. These lenses can be a part of two or more camera modules that can be placed on substantially opposite sides of spherical camera device 100 to ensure that a 360 degree field of view around the device can be captured.

In practice, fisheye lenses can be designed with a focal length substantially smaller than the focal length of a normal lens for a given film plane. This design can allow the lens to capture a wider field of view than a normal lens. Furthermore, when compared to normal lenses, the physical appearances of fisheye lenses often exhibit a convex characteristic. This property can be conceptually illustrated by the slight curve of fisheye lens 110 and fisheye lens 112.

Rather than producing images with straight lines of perspective (e.g., rectilinear images), fisheye lenses can use a special mapping (e.g., an equisolid angle mapping) to give captured images a convex non-rectilinear appearance. For example, hemisphere image 120 can represent an example image that captured by a camera module with fisheye lens 110 and hemisphere image 122 can represent an example image that can be captured by a camera module with fisheye lens 112. Each hemisphere image exhibits some form of non-rectilinearly, notably near the edges of the image. The special convexity can allow each hemisphere image to capture wide field of view when compared to normal lenses. In example embodiments, fisheye lens 110 and fisheye lens 112 can be configured to capture fields of view of 180 degrees or greater (e.g., 200 degrees or 220 degrees) with respect to spherical camera device 100.

It should be appreciated that the embodiments herein use fisheye lenses for the purposes of example. In practice, many different types of wide-angle lenses can be used with respect to example embodiments or techniques described herein.

Once hemisphere image 120 and hemisphere image 122 are captured substantially simultaneously by spherical camera device 100, hemisphere image 120 and hemisphere image 122 can be merged together via stitching process 130 to create a single, 360 degree field of view image, such as image 140. Given that hemisphere image 120 and hemisphere image 122 can represent images captured with wide fields of view (i.e., 180 degrees or greater), stitching process 130 can use the wide fields of view to sufficiently cover the entire 360 degree field of view with respect to spherical camera device 100. Stitching process 130 can occur directly on spherical camera device 100 or on a remote server/computing device with the results communicated back to spherical camera device 100. Stitching process 130 can include one or more algorithms that combine the pixels from two separate images to create a single, cohesive image. Example algorithms can find a set of distinctive key-points in both images, define a region around each key-point, extract and normalize regional content around key-points, compute a local descriptor from the normalized regions, and match local descriptors to create the single, cohesive image.

It should be appreciated that substantially simultaneous capture as used herein can refer to a camera device capturing multiple images within a brief time window. As one example, a camera device can capture multiple images all at precisely the same time. In another example, a camera device can capture a first image at T=10 ms and a second image at T=10.1 ms. Other examples of substantially simultaneous capture can appreciated within the scope of the current disclosure.

Image 140 can be an image that results from stitching process 130. When displayed in a 2-D dimensional medium, image 140 can appear as a 360 degree field of view panoramic image with respect to spherical camera device 100. As shown in FIG. 1, image side 142 can correspond to elements from hemisphere image 120 and image side 144 can correspond to elements from hemisphere image 122.

Figure 2:
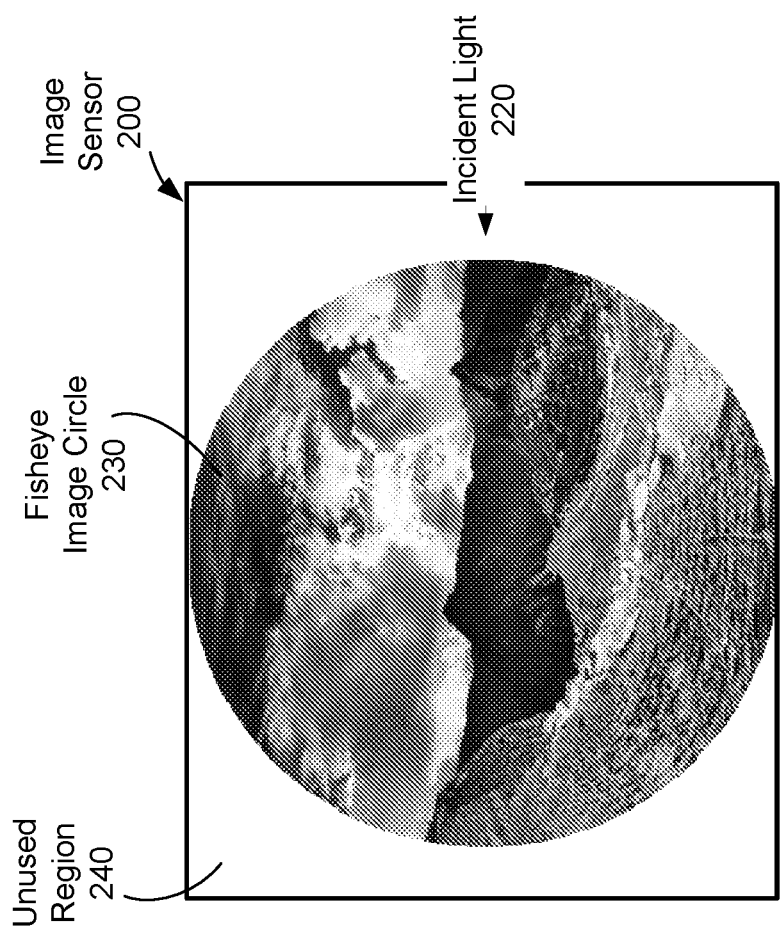
FIG. 2 is a diagram illustrating an image sensor, in accordance with some example embodiments.
Figure 2:
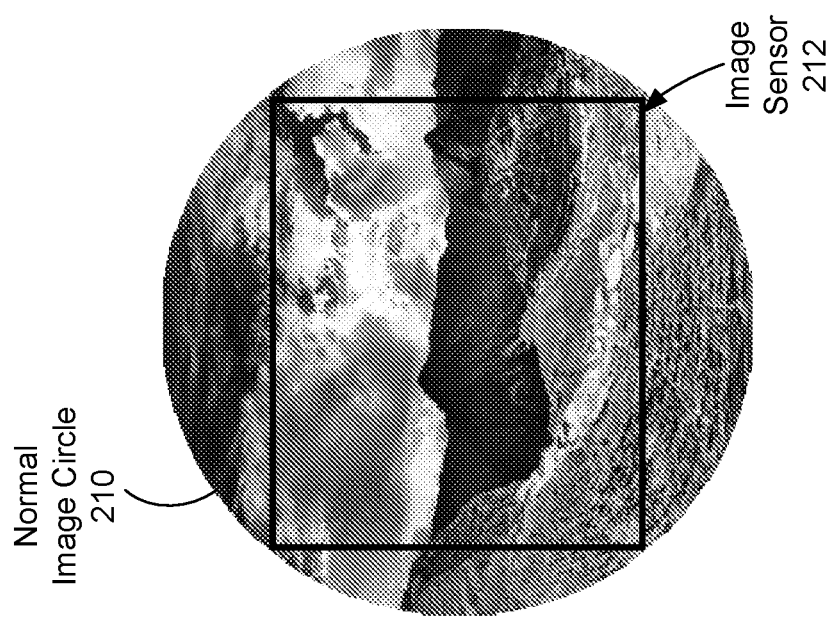

FIG. 2 is a diagram illustrating image sensor 200, in accordance with example embodiments. Image sensor 200 can be used by camera modules of spherical camera device 100. When spherical camera device 100 is instructed to capture an image of an environment, incident light 220 from the environment enters into spherical camera device 100 and reaches image sensor 200. Image sensor 200 then uses pixel elements (e.g., photosites disposed on the image sensor) to capture and record information about the incident light 220. Then, spherical camera device 100 can utilize the recorded information about incident light 220 to generate an image of the environment, for example, illustrated in FIG. 1 as hemisphere image 120 and/or hemisphere image 122. Nonetheless, the number of pixel elements used by spherical camera device 100 to capture incident light 220 can depend on the type of lens used by a camera.

In general, a camera module utilizing a normal (e.g., non-wide angle) lens can admit light to create an image circle whose diameter is greater than a diagonal of the corresponding image sensor. This property can be represented by normal image circle 210 and associated image sensor 212. Since normal lenses allow image sensor 212 to be inscribed in normal image circle 210, all the pixel elements of the image sensor can be utilized when capturing the image.

On the other hand, when using a fisheye lens (or another wide-angle lens), the image circle can be restricted by the wide-angle properties of the lens. Since a wider field of view (e.g., greater than or equal to 180 degrees) can fit within the image sensor, the image circle can be configured to cover no more than a shortest dimension of the image sensor. This property can be represented by fisheye image circle 230. As a result, fisheye image circle 230 can reach from the top to bottom of image sensor 200, but not to the sides or corners.

Since fisheye image circle 230 is much smaller than the active region of image sensor 200, pixel elements of the image sensor outside of fisheye image circle 230 may be unutilized as illustrated by unused region 240. By not utilizing these pixel elements, the image captured by spherical camera device 100 can be of lower quality. That is, the angular resolution (e.g., pixels per a degree in the field of view) can be lower than if all the pixel elements of image sensor 200 were to be utilized. For example, unused region 240 may account for 48% of pixels in image sensor 200, meaning that only 52% of available pixels are being utilized for actually capturing images.

Figure 3:
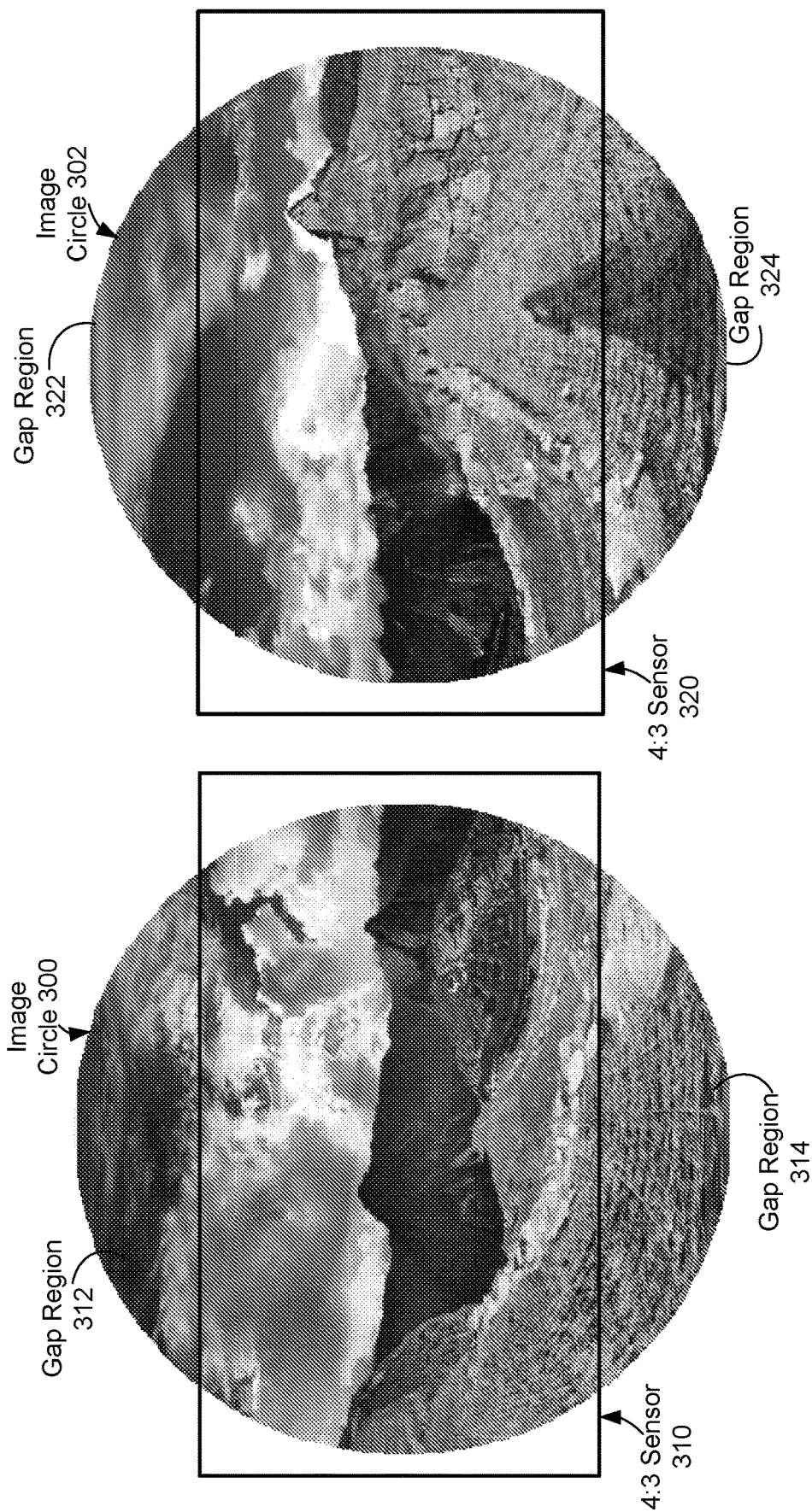
FIG. 3 illustrates an camera module arrangement designed for greater pixel utilization, in accordance with some example embodiments.

FIG. 3 illustrates a camera module arrangement for greater pixel utilization, in accordance with some example embodiments. FIG. 3 depicts 4:3 image sensor 310 and 4:3 image sensor 320 which can be used by camera modules on spherical camera device 100 to capture two hemispheric images on substantially opposite sides of the device. These two hemispheric images can then be stitched together to create a final 360 degree spherical image and/or panoramic image.

It should be noted that the 4:3 prefix as used herein represents the aspect ratio, or ratio of width to height, of the image sensor. For example, a 4:3 image sensor can be an image sensor with a 4000 pixel width and a 3000 pixel height, giving the image sensor a total of 12 MP. While 4:3 is a conventional aspect ratio, other aspect ratios such as 1:1, 3:2 and/or 16:9 may be contemplated within the scope of this disclosure. For example, a 1:1 image sensor can be a sensor with a 4000 pixel width and a 4000 pixel height, giving the image sensor a total of 16 MP. As another example, a 1:1 image sensor can be a sensor with a 3000 pixel width and a 3000 pixel height, giving the image sensor a total of 9 MP.

As shown in FIG. 3, image circle 300 can be larger than the corresponding 4:3 image sensor 310 and image circle 302 can be larger than the corresponding 4:3 image sensor 320. When compared to an inscribed image circle as depicted in FIG. 2, the larger image circles of FIG. 3 may enable a larger percentage of pixels within each image sensor to be utilized. For example, 4:3 image sensor 310 and 4:3 image sensor 320 may now utilize 80-90% of pixels when capturing an image, which is a higher utilization rate than the ~52% utilization rate discussed above in the context of FIG. 2.

However, due to the larger size, both image circle 300 and image circle 302 contain regions that are not captured by any image sensors. As used herein, "gaps" can refer to any uncaptured pixels/regions with respect to the image circle for a given sensor. This concept can be illustrated by gap regions (GR) 312 and 314 on image circle 300 and GR 322 and 324 on image circle 302. These gaps in coverage illustrated by GR 312, 314, 322, 324 may make the camera module arrangement of FIG. 3 impractical.

Figure 4A:
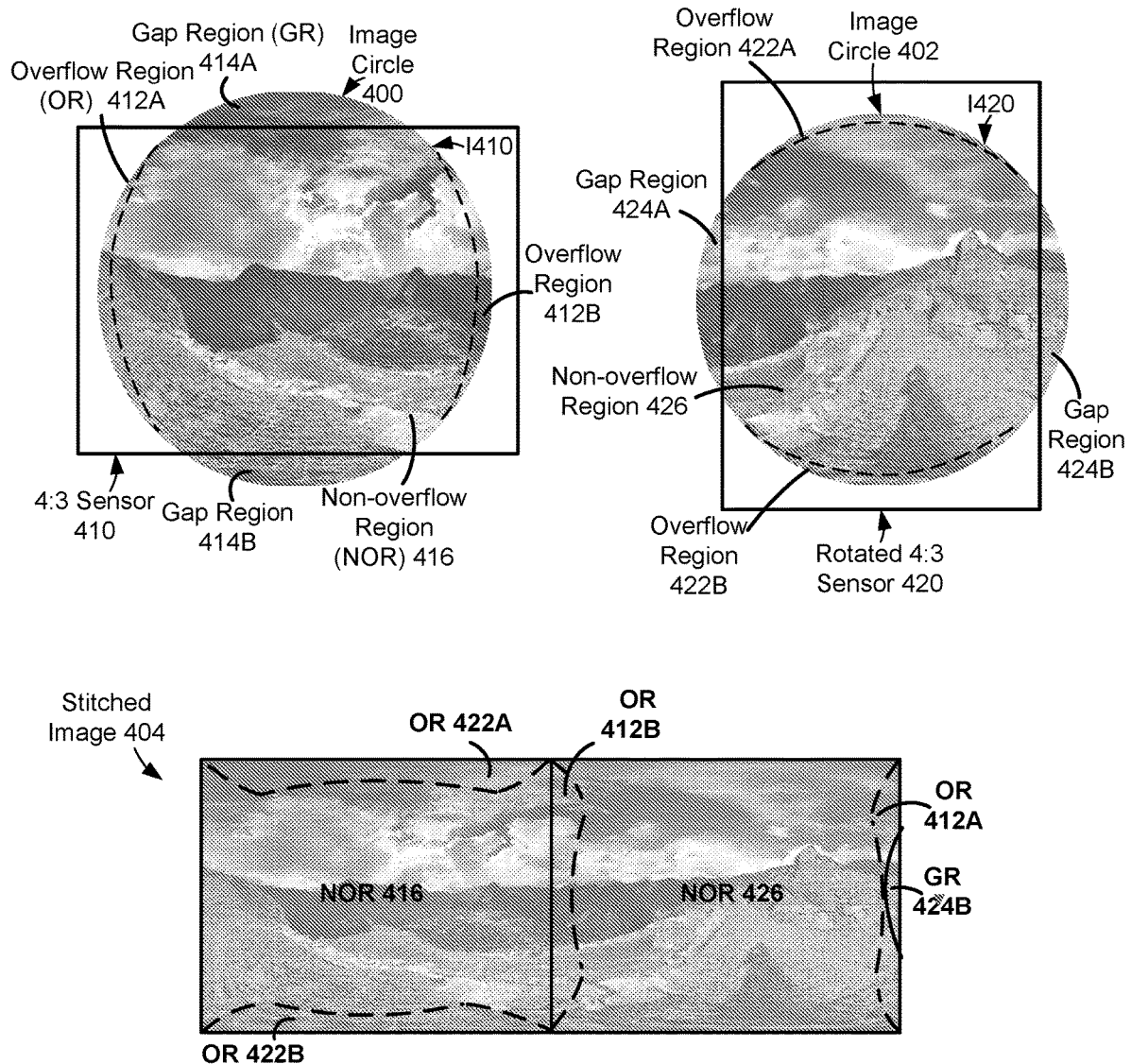
FIG. 4A illustrates an alternative approach for greater pixel utilization, in accordance with some example embodiments.

FIG. 4A illustrates an alternative camera module arrangement for greater pixel utilization, in accordance with example embodiments. Like FIG. 3, FIG. 4A illustrates using two 4:3 image sensors that can be used by camera modules on spherical camera device 100 to capture two hemispheric images on substantially opposite sides of the device. These two images can then be stitched together to create a final 360 degree spherical image and/or panoramic image, for instance, stitched image 404. It should be noted that elements of FIG. 4A are not necessarily drawn to scale and are presented for a conceptual illustration of the embodiments herein.

Similarly to the arrangement of FIG. 3, image circle 400 can be larger than corresponding 4:3 image sensor 410 and image circle 402 can be larger than the corresponding rotated 4:3 image sensor 420. These larger image circles can enable a larger percentage of pixels within each image sensor to be used. For example, 4:3 image sensor 410 and rotated 4:3 image sensor 420 can utilize 80-90% of pixels when capturing an image.

Yet, unlike the arrangement of FIG. 3, the camera module arrangement of FIG. 4A utilizes rotated 4:3 sensor 420. More specifically, 4:3 image sensor 410 can be on a first camera module placed on one side of spherical camera device 100 while rotated 4:3 image sensor 420 can be on a second camera module placed on the substantially opposite side of spherical camera device 100 from the first camera module. In example embodiments, rotated 4:3 image sensor 420 or the camera module containing rotated 4:3 image sensor 420 can be oriented at a relative rotation of +/−90 degrees from the orientation of 4:3 image sensor 410 or the camera module containing 4:3 image sensor 410. With this rotation, the camera module arrangement of FIG. 4A can enable overflow pixels (i.e., additional pixels captured beyond the 180 degree field of view with respect to a given image sensor) captured by one sensor to fill the image gaps created by the other image sensor. Overflow pixels can be obtained through the properties of fisheye lenses or other wide-angle lenses. In particular, the lens used for 4:3 image sensor 410 and rotated 4:3 image sensor 420 can have a field of view greater than 180 degrees so as to capture regions in the opposite hemisphere. For example, each lens may have a field of view of 210 degrees or 220 degrees. As described, a stitching process that can utilize the camera module arrangement of FIG. 4A may be referred to as baseball stitching.

In example embodiments, the determination of whether to rotate an image sensor or the camera module containing the image sensor may be based on the hardware used by spherical camera device 100. For example, in scenarios where the camera modules of spherical camera device 100 are relatively large, the image sensors may be rotated to allow for easier packaging of spherical camera device 100. In other scenarios, the use of camera modules having two differently rotated sensors may be impractical (e.g., extra part numbers to track, hard to tell two modules with rotated sensors apart, etc.). Thus, each camera modules may have the same image sensor orientation and spherical camera device 100 may rotate one camera module with respect to the other module (thereby rotating one sensor with respect to the other sensor).

Figure 4B:
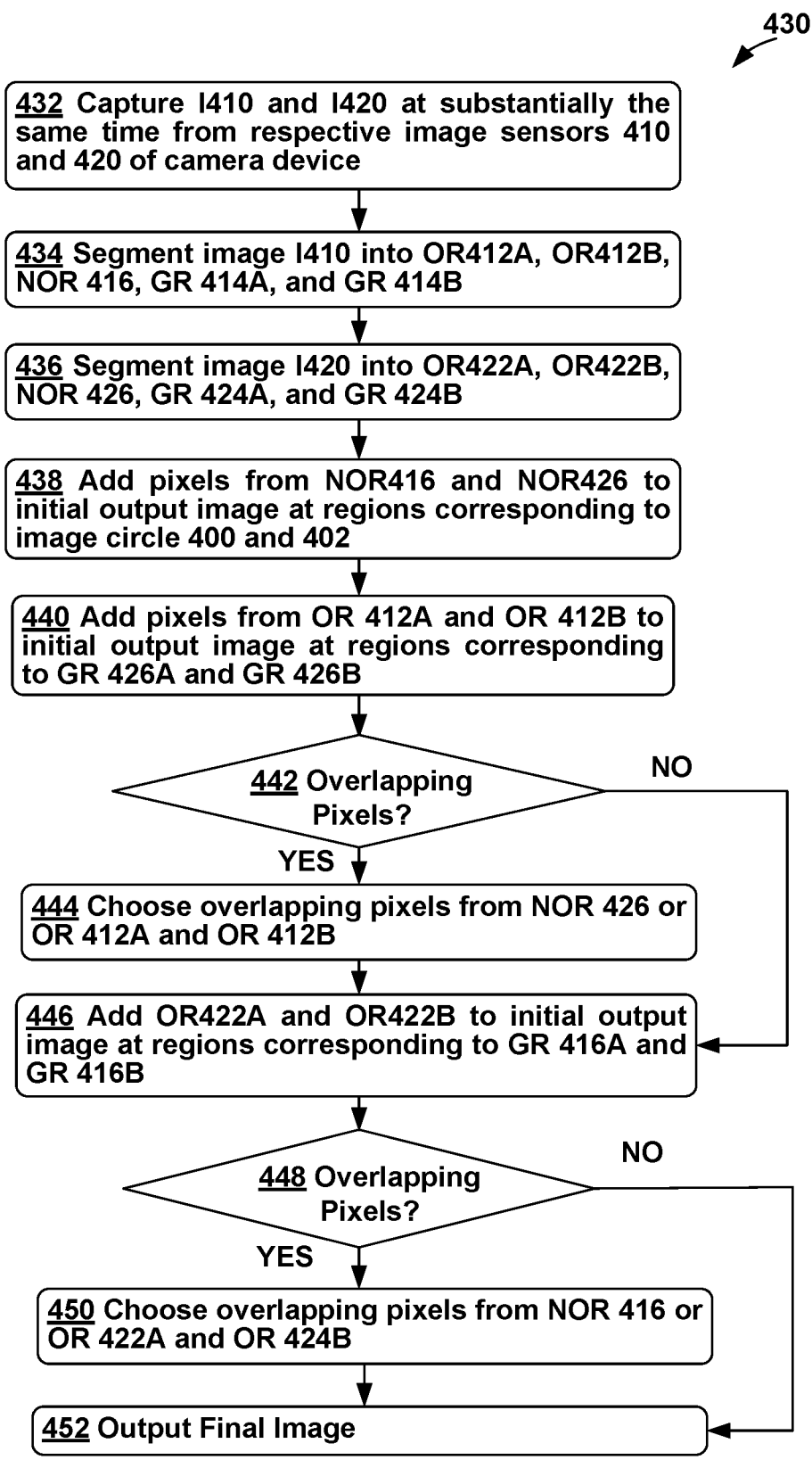
FIG. 4B illustrates a method for baseball stitching, in accordance with some example embodiments.

FIG. 4B illustrates a method 430 for baseball stitching, in accordance with some example embodiments. In some examples, method 430 embodies stitching process 130. Method 430 can be carried out by spherical camera device 100 and/or one or more computing devices 800. Method 430 may be utilized to form a 360 degree spherical image and/or panoramic image from two input images. For example, method 430 may be used to form stitched image 404 from input images 1410 and 1420.

Method 430 can begin at block 432, where spherical camera device 100 captures, at substantially the same time, image 1410 using a camera module with 4:3 image sensor 410 and image 1420 using a camera module with rotated 4:3 image sensor 420. As illustrated in FIG. 4A, 1410 can represent the pixels captured within the bounds of both image circle 400 and 4:3 image sensor 410 while 1420 can represent the pixels captured within the bounds of both image circle 402 and rotated 4:3 image sensor 420.

At block 434, image 1410 can be segmented into overflow region (OR) 412A, OR 412B, and non-overflow region (NOR) 416. OR 412A and OR 412B can be obtained by identifying pixels captured beyond the 180 degree field of view with respect to 4:3 image sensor 410. NOR 416 can be obtained by identifying pixels captured within the 180 degree field of view with respect to 4:3 image sensor 410. In some cases, the camera module with 4:3 image sensor 410 can determine gap region (GR) 414A and GR 414B to support subsequent operations. These regions can be obtained by identifying uncaptured pixels outside the bounds of 4:3 image sensor 410 but within the bounds of image circle 400.

At block 436, image 1420 can be segmented into OR 422A, OR 422B, and NOR 426. OR 422A and OR 422B can be obtained by identifying pixels captured beyond the 180 degree field of view with respect to rotated 4:3 image sensor 420. NOR 426 can be obtained by identifying pixels within the 180 degree field of view with respect to rotated 4:3 image sensor 420. In some cases, the camera module with rotated 4:3 image sensor 420 can determine GR 424A and GR 424B to support subsequent operations. These regions can be obtained by identifying uncaptured pixels outside the bounds of rotated 4:3 sensor 420, but within the bounds of image circle 402.

At block 438, the pixels from NOR 416 and NOR 426 can be added to initialize a 360 degree output image. Specifically, NOR 416 can be added to a region of the 360 degree output image corresponding to the center of image circle 400 and NOR 426 can be added to a region of the 360 degree output image corresponding to the center of image circle 402. This initialization is depicted in stitched image 404 of FIG. 4A by NOR 416 at the center-left of stitched image 404 and NOR 426 at the center-right of stitched image 404.

At block 440, pixels from OR 412A and OR 412B can be added to the 360 degree output image. By way of example, pixels from OR 412A can be added to the region of the 360 degree output image corresponding to GR 424A and pixels from OR 412B can be added to the region of the output image corresponding to GR 424B. This addition of pixels is depicted in stitched image 404 of FIG. 4A by OR 412B at the center of stitched image 404 and OR 412A at the far right side of stitched image 404.

In some embodiments, pixels captured in overflow regions of one sensor can overlap with pixels captured in the non-overflow regions of the substantially opposite sensor. For example, instead of pixels from OR412A perfectly filling GR 424B, pixels from the OR 412A may overlap with pixels that have already been captured. This concept can be illustrated in stitched image 404. Given that GR 424B represents a region with uncaptured pixels, OR 412A is shown to fill pixels missing from GR 424B, but overlaps into the region NOR 426 (i.e., the region inside OR 412A but outside of GR 424B). Moreover, it should be noted that for the purpose of clarity, GR 424A, GR 414A, and GR 414B are omitted from the stitched image 404. However, in practice, these regions exist and similar types of overlap may occur if the pixels from OR 422A, OR 422B, and OR 412B do not perfectly fill these gap regions.

Accordingly, at block 442, the baseball stitching method 430 can determine whether pixels from OR 412A/OR 412B overlap with pixels of NOR 426. If overlapping pixels are found, method 430 can continue to block 444. Otherwise, method 430 can continue to 446.

At block 444, for each overlapping pixel, method 430 can select either an overlapping pixel from OR 412A/OR412B or an overlapping pixel from NOR 426 for use as the particular output pixel of the output image. In one example, method 430 can be configured to always select pixels from OR 412A/OR 412B. In another example, method 430 can be configured to always select pixels from NOR 426. In yet another example, method 430 can be configured to alternate between selecting from OR 412A/OR 412B or NOR 426. That is, a first overlapping pixel can be selected from OR 412A/OR412B, a second overlapping pixel can be selected from NOR 426, a third overlapping pixel can be selected from OR 412A/OR412B, and so on. Moreover, in some cases, method 430 can further involve blending together overlapping pixels from OR 412A/OR412B with overlapping pixels from NOR 426 for use as output pixels of the output image. In one example, method 430 can be configured to use stitching algorithms (e.g., based on depth estimation, optical flow, or adaptive homography) that can blend together overlapping pixels. Stitching algorithms can be stored/executed on spherical camera device 100 or, if the stitching algorithms are computationally intensive, can be stored/executed on remote computing devices 800 communicatively coupled to spherical camera device 100.

At block 446, pixels from OR 422A and OR 422B can be added to the initial 360 degree output image. By way of example, pixels from OR 422A can be added to the region of the output image corresponding to GR 414A and pixels from OR 422B can be added to the region of the output image corresponding to GR 414B. This addition of pixels is depicted in stitched image 404 of FIG. 4A by OR 422A at the top left of stitched image 404 and OR 422B at the bottom left of stitched image 404.

Similarly to block 442, at block 448, method 430 can determine whether pixels from OR 422A and/or OR 422B overlap with pixels of NOR 416. If overlapping pixels are found, method 430 can continue to block 450. Otherwise, method 430 can continue to 452.

At block 450, for each overlapping pixels, method 430 can select either an overlapping pixel from OR 422A/OR422B or an overlapping pixel from NOR 416 for use as the particular output pixel of the output image. In one example, method 430 can be configured to always select pixels from OR 422A/OR 422B. In another example, method 430 can be configured to always select pixels from NOR 416. In yet another example, method 430 can be configured to alternate between selecting from OR 422A/OR 422B or NOR 416. That is, a first overlapping pixel can be selected from OR 422A/OR422B, a second overlapping pixel can be selected from NOR 416, a third overlapping pixel can be selected from OR 422A/OR422B, and so on. At block 452, a final 360 degree image, for example stitched image 404, with no gap regions can be outputted. Moreover, in some cases, method 430 can further involve blending together overlapping pixels from OR 422A/OR 422B with overlapping pixels from NOR 416 for use as output pixels of the output image. In one example, method 430 can be configured to use stitching algorithms (e.g., based on depth estimation, optical flow, or adaptive homography) that can blend together overlapping pixels Stitching algorithms can be stored/executed on spherical camera device 100 or, if the stitching algorithms are computationally intensive, can be stored/executed on remote computing devices 800 communicatively coupled to spherical camera device 100.

Figure 4C:
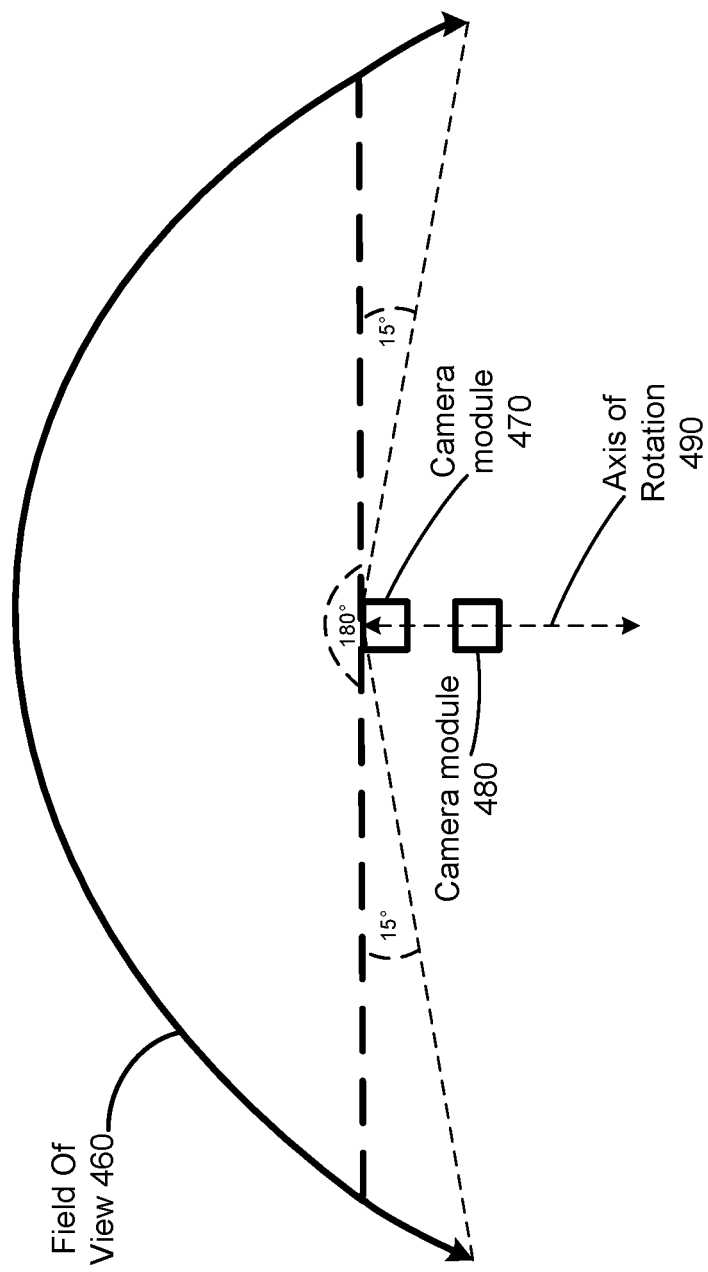
FIG. 4C illustrates a field of view for a camera module, in accordance with some example embodiments.

FIG. 4C illustrates the field of view 460 for camera module 470, in accordance with some example embodiments. In particular, FIG. 4C illustrates how overflow pixels can be obtained by camera module 470. Camera module 470 and camera module 480 can represent camera modules used by spherical camera device 100. For example, camera module 470 can utilize 4:3 image sensor 410 and camera module 480 can utilize rotated 4:3 image sensor 420. Moreover, both camera module 470 and 480 may use fisheye and/or wide-angle lenses.

Field of view 460 illustrates the angular extent of a given scene that can be captured by camera module 470. Use of a fisheye lens on camera module 470 can enable field of view 460 to be larger than 180 degrees. This is shown by an additional 15 degree field of view at center left of FIG. 4C and the additional 15 degree field of view at center right of FIG. 4C that can be captured by camera module 470. As a result, camera module 470 may have a 210 degree total field of view, meaning that camera module 470 can capture light from "behind" (e.g., in the environment opposite the environment faced by camera module 470). This property allows for camera module 470 to obtain overflow pixels from environment faced by camera module 480 and vice versa.

FIG. 4C also demonstrates how relative rotation of rotated 4:3 image sensor 420 and/or a camera module having rotated 4:3 image sensor 420 can be achieved. In example embodiments, camera module 470 can be rotated with respect to axis of rotation 490. The axis can be aligned to be substantially parallel to the optical axis of camera modules 470 and 480, thus allowing camera module 470 to capture the image gaps of camera module 480, and vice versa. It should be noted that FIG. 4C is not necessarily drawn to scale and is presented as a conceptual illustration of the embodiments herein.

In some embodiments, spherical camera device 100 can utilize a baseball stitching method, such as method 430, with more than two camera modules. That is, given a number of camera modules N, each module can be disposed around spherical camera device 100, with each module having corresponding image sensor a lens with field of view of at least 360/N degrees. For example, if N=4, each module may have a lens with a field of view of at least 90 degrees. Furthermore, each camera module may be disposed around spherical camera device 100 with respect to a single plane with each modules spaced approximately 90 degrees apart.

Figure 5:
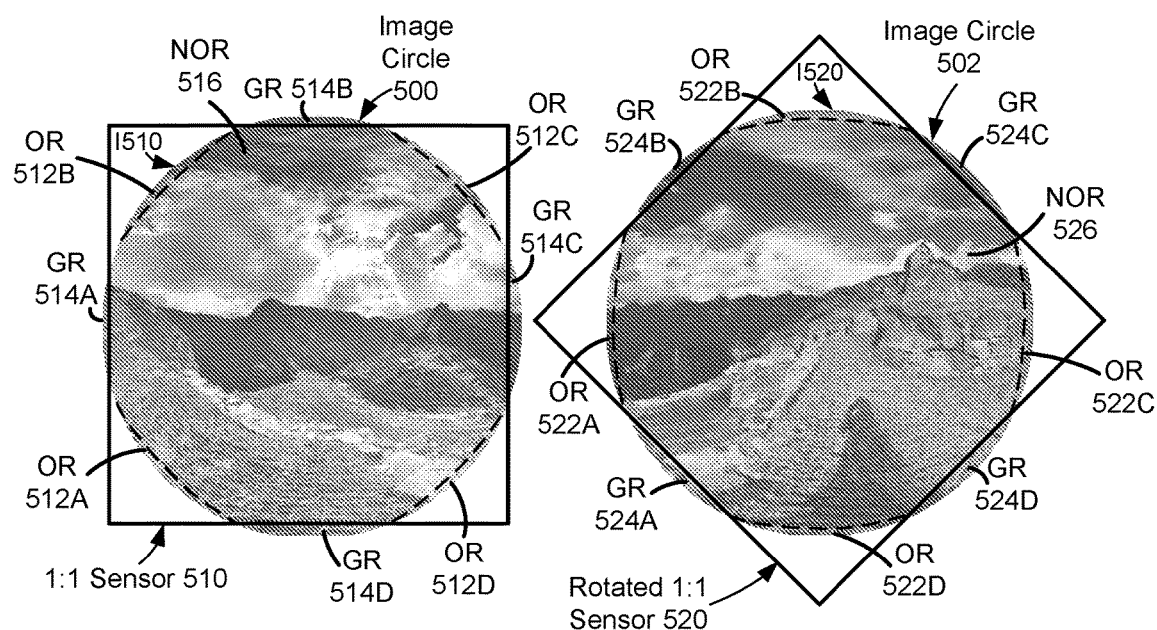
FIG. 5 illustrates a camera module arrangement for greater pixel utilization using 1:1 image sensors, in accordance with some example embodiments.
Figure 5:
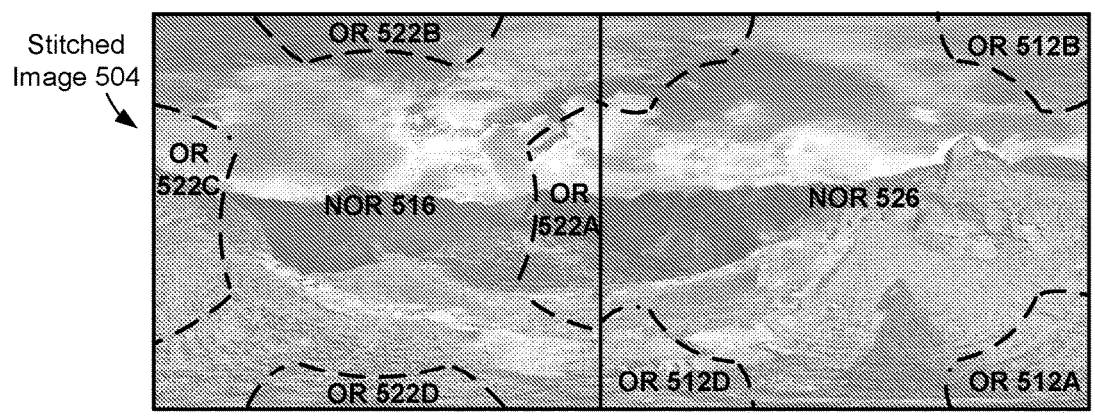

FIG. 5 illustrates a camera module arrangement for greater pixel utilization when using 1:1 image sensors, in accordance with some example embodiments. FIG. 5 depicts 1:1 image sensor 510 and 1:1 image sensor 520 which can be used by camera modules on spherical camera device 100 to capture two hemispheric images on substantially opposite sides of the device. These two images can then be stitched together to create a final 360 degree spherical image and/or panoramic image, for instance, stitched image 504. It should be noted that elements of FIG. 5 are not necessarily drawn to scale and are presented for a conceptual illustration of the embodiments herein.

1:1 image sensor 510 can exist on a camera module placed on one side of spherical camera device 100 while rotated 1:1 image sensor 520 can exist on camera module placed on the substantially opposite side of spherical camera device 100. In example embodiments, rotated 1:1 image sensor 520 or the camera module containing rotated 1:1 image sensor 520 can be oriented at a relative rotation of +/−45 degrees from the orientation of 1:1 image sensor 510 or the camera module containing 1:1 image sensor 510. This rotation may be done with respect to an axis of rotation that is aligned with the focal points of both 1:1 image sensor 510 and rotated 1:1 sensor 520 (or the focal points of the camera modules containing 1:1 image sensor 510 and rotated 1:1 sensor 520), as similarly described in FIG. 4C. With this rotation, the arrangement of FIG. 5 can enable overflow pixels captured by one sensor to fill the gaps created by the other image sensor, and vice versa.

As illustrated by FIG. 5, a smaller rotation (e.g., +/−45 degrees vs +/−90 degrees) can be used for rotated 1:1 image sensor 520 when compared to rotated 4:3 image sensor 420 of FIG. 4A. This can be explained from the properties of 1:1 image sensors: while 4 distinct gap regions (e.g., 514A, 514B, 514C, and 514D) occur on all sides of the image circle 500, each gap region can be smaller those depicted in FIG. 4A. As a result, the geometry of 1:1 image sensors can allow the corner regions of rotated 1:1 image sensor 520 (e.g., 522A, 522B, 522C, and 522D) to act as overflow regions, rather than the sides of the 4:3 image sensor as illustrated in FIG. 4A. This property can allow for a relative rotation of +/−45 rather than a relative rotation of +/−90 degrees.

Similarly to method 430, the camera module of arrangement of FIG. 5 can use baseball stitching to produce an output 360 degree image, for example stitched image 504, with no gap regions. As an example, spherical camera device 100 can capture, at substantially the same time, image 1510 using a camera module with 1:1 image sensor 510 and image 1520 using a camera module with rotated 1:1 image sensor 520. As illustrated in FIG. 5, 1510 can represent the pixels captured within the bounds of both image circle 500 and 1:1 image sensor 510 while 1520 can represent the pixels captured within the bounds of both image circle 502 and rotated 1:1 image sensor 520. Next, image 1510 can be segmented into overflow regions 512A-D, and non-overflow region 516. Similarly, image 1520 can be segmented into overflow regions 522A-D and non-overflow region 526. Then, an output 360 degree image can be formed by adding portions of overflow regions 512A-D, overflow regions 522A-D, and non-overflow regions 516 and 526. The additive actions used to form stitched image 504 from input images 1510 and 1520 are illustrated in stitched image 504, which shows the sources of pixels used to form stitched image 504. It should be noted that for the purpose of clarity, GR 514A-D and GR 524A-D are omitted from the stitched image 504. However, in practice, these regions exist and overlapping pixels, as discussed in connection with FIG. 4A, may occur if the pixels from OR 512A-D and OR 522A-D do not perfectly fill the gap regions.

It should also be noted that camera devices using 1:1 image sensors can have lenses with smaller fields of view than a camera device using 4:3 image sensors. For example, in order to capture a suitable region of overflow pixels, camera devices with 4:3 image sensors may use, at a minimum, lenses with a 205 degree field of view. On the other hand, due to the smaller gap regions, camera devices with 1:1 image sensors may use lenses with a 194 degree field of view lens in order to capture the suitable region of overflow pixels.

Figure 6:
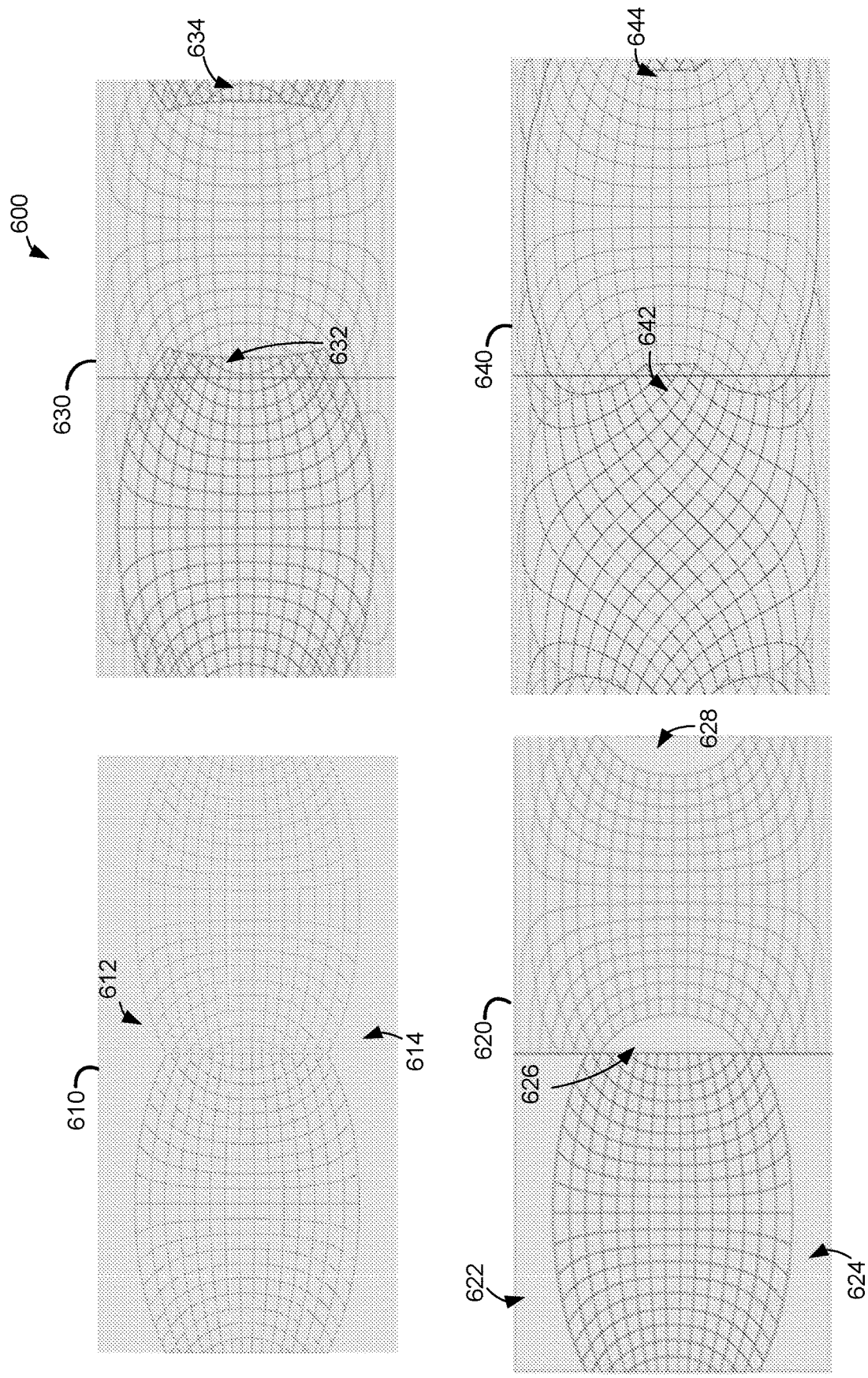
FIG. 6 illustrates a series of equi-rectangular perspective lines, in accordance with some example embodiments.

FIG. 6 illustrates a series of equi-rectangular perspective lines, in accordance with some example embodiments. Each set of equi-rectangular perspective (ERP) lines can represent a portion of an environment captured by a specific image sensor arrangement. It will be appreciated that while the ERP lines can represent pixels captured by the image sensors arrangement, the regions surrounding the ERP lines (as illustrated by the darker shading) can represent areas of an environment in which no pixels are captured (e.g., gap regions).

ERP lines 610 can correspond to images captured by the camera module arrangement of FIG. 3. For example, an image represented by the ERP lines on the left side of ERP lines 610 can be captured by 4:3 image sensor 310 and an image represented by the ERP lines of the right side of ERP lines 610 can be captured by 4:3 image sensor 320. Notably, ERP lines 610 contain gap regions 612 and 614 where no pixels are captured. As described above, these gap regions may make the camera module arrangement of FIG. 3 impractical.

ERP lines 620 can correspond to images captured by the camera module arrangement of FIG. 4A using lenses having a 180 degree field of view. For example, an image represented by the ERP lines on the left side of ERP lines 620 can be captured by 4:3 image sensor 410 and an image represented by the ERP lines of the right side of ERP lines 620 can be captured by rotated 4:3 image sensor 420. However, rather than using wide-angle lenses with fields of view greater than 180 degrees, ERP lines 620 can represent images that are captured using lenses with fields of view at, or substantially near, 180 degrees. By using 180 degree field of view lenses, the amount of overflow pixels (i.e., additional pixel regions beyond a camera module's 180 degree field of view) can be limited. Given that gap regions can be filled by pixels from overflow regions, this can result in one or more unfilled gap regions, as illustrated by gap regions 622, 624, 626, and 628. These gaps in coverage may make using 180 degree field of view lens with the camera module arrangement of FIG. 4 impractical.

ERP lines 630 can correspond to images captured by the camera module arrangement of FIG. 4A using wide-angle lenses. For example, an image represented by the ERP lines on the left side of ERP lines 630 can be captured by 4:3 image sensor 410 and an image represented by the ERP lines of the right side of ERP lines 630 can be captured by rotated 4:3 image sensor 420. ERP lines 630 can represent images that are captured using wide-angle lenses with fields of view greater than 180 degrees. Use of wide-angle lenses can allow 4:3 image sensor 410 to capture overflow pixels that can be used to fill the gap regions of rotated 4:3 image sensor 420, and vice versa. For example, regions 632 and 634 are presented as a conceptual illustration of this "filling" property that can be achieved by method 430, where ERP lines of the left side of ERP lines 630 overflow into the ERP lines of the right side of ERP lines 630.

ERP 640 can correspond to images captured by the camera module arrangement of FIG. 5 using wide-angle lenses. For example, an image represented by the ERP lines on the left side can be captured by 1:1 image sensor 510 and an image represented by the ERP lines of the right side can be captured by rotated 1:1 image sensor 520. Similarly to ERP lines 630, ERP lines 640 can represent images that are captured using wide-angle lenses with field of view greater than 180 degrees. Use of wide-angle lenses can allow 1:1 image sensor 510 to capture overflow pixels that can be used to fill the gap regions of rotated 1:1 image sensor 520, and vice versa. For example, regions 642 and 644 are presented as a conceptual illustration of this "filling" property that can be achieved by method 430, where ERP lines of the left side of ERP lines 640 overflow into the ERP lines of the right side of ERP lines 640.

Example Data Network

Figure 7:
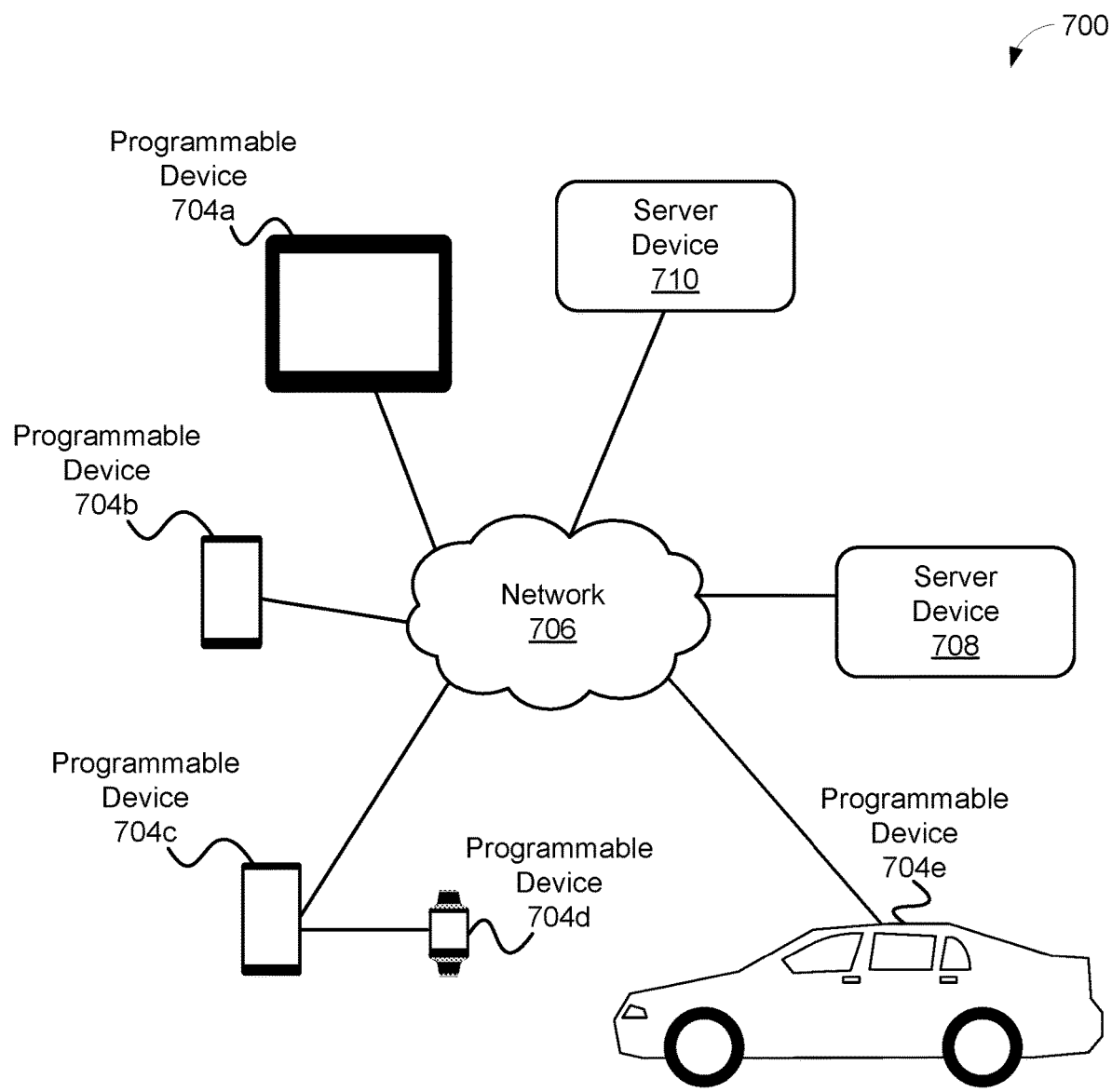
FIG. 7 depicts a distributed computing architecture, in accordance with some example embodiments.
Figure 8:
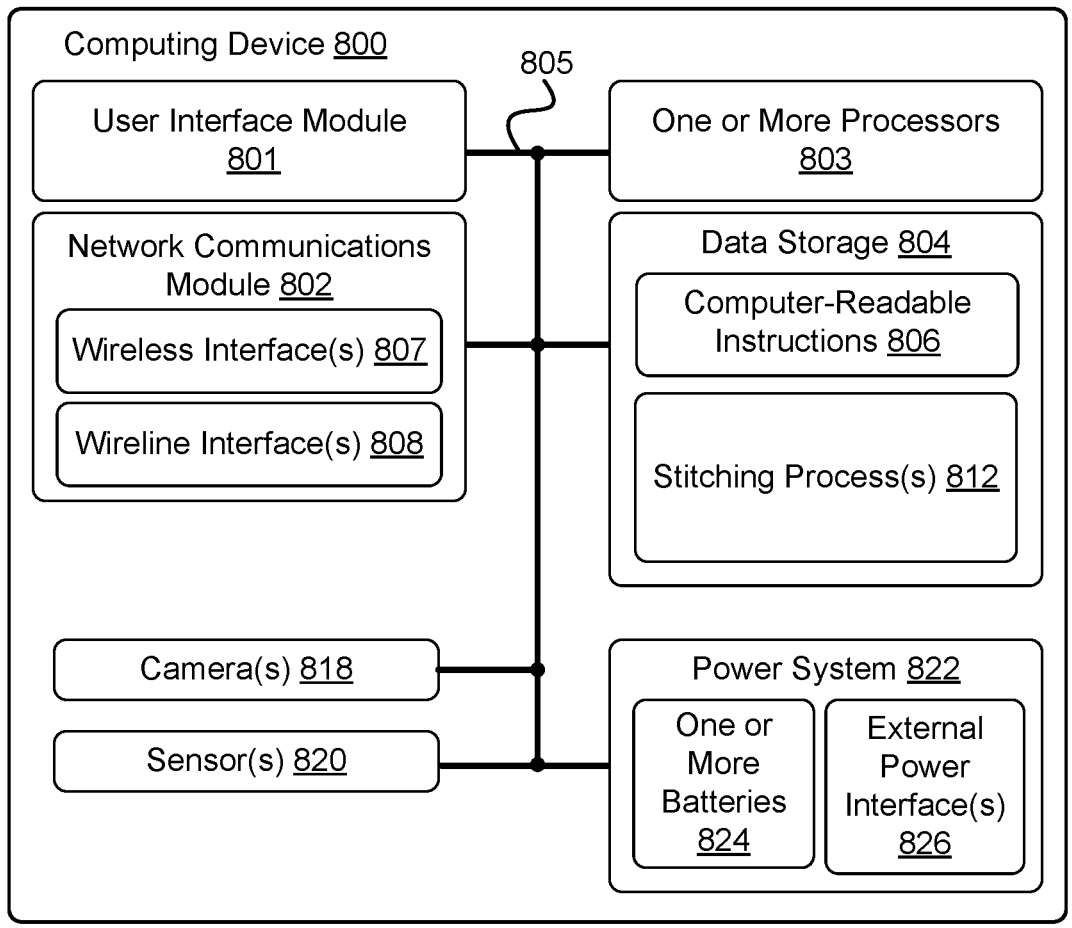
FIG. 8 is a functional block diagram of a computing device, in accordance with some example embodiments.

FIG. 7 depicts distributed computing architecture 700, in accordance with example embodiments. Distributed computing architecture 700 includes server devices 708, 710 that are configured to communicate, via network 706, with programmable devices 704a, 704b, 704c, 704d, 704e. Network 706 may correspond to a local area network (LAN), a wide area network (WAN), a WLAN, a WWAN, a corporate intranet, the public Internet, or any other type of network configured to provide a communications path between networked computing devices. Network 706 may also correspond to a combination of one or more LANs, WANs, corporate intranets, and/or the public Internet. In example embodiments, spherical camera device 100 can take the form of a programmable device operating on network 706.

Although FIG. 7 only shows five programmable devices, distributed application architectures may serve tens, hundreds, or thousands of programmable devices. Moreover, programmable devices 704a, 704b, 704c, 704d, 704e (or any additional programmable devices) may be any sort of computing device, such as an ordinary laptop computer, desktop computer, wearable computing device, mobile computing device, head-mountable device (HMD), network terminal, wireless communication device (e.g., a smart phone or cell phone), and so on. In some examples, such as illustrated by programmable devices 704a, 704b, 704c, 704e, programmable devices can be directly connected to network 706. In other examples, such as illustrated by programmable device 704d, programmable devices can be indirectly connected to network 706 via an associated computing device, such as programmable device 704c. In this example, programmable device 704c can act as an associated computing device to pass electronic communications between programmable device 704d and network 706. In other examples, such as illustrated by programmable device 704e, a computing device can be part of and/or inside a vehicle, such as a car, a truck, a bus, a boat or ship, an airplane, etc. In other examples not shown in FIG. 7, a programmable device can be both directly and indirectly connected to network 706.

Server devices 708, 710 can be configured to perform one or more services, as requested by programmable devices 704a-704e. For example, server device 708 and/or 710 can provide content to programmable devices 1604a-1604e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 708 and/or 70 can provide programmable devices 704a-704e with access to software for database, search, computation, graphical, audio, video, World Wide Web/Internet utilization, and/or other functions. Many other examples of server devices are possible as well Computing Device Architecture FIG. 800 is a functional block diagram of an example computing device 800, in accordance with example embodiments. In particular, computing device 800 shown in FIG. 800 can be configured to perform at least one function of a stitching algorithm, a computing device, an operating system, a software application, spherical camera device 100, stitching process 130, 4:3 image sensor 410, rotated 4:3 image sensor 420, method 430, 1:1 image sensor 510, rotated 1:1 image sensor 520, and/or computing architecture 700.

Computing device 800 may include a user interface module 801, a network communications module 802, one or more processors 803, data storage 804, one or more sensors 820, and power system 822, all of which may be linked together via a system bus, network, or other connection mechanism 805.

User interface module 801 can be operable to send data to and/or receive data from external user input/output devices. For example, user interface module 801 can be configured to send and/or receive data to and/or from user input devices such as a touch screen, a computer mouse, a keyboard, a keypad, a touch pad, a track ball, a joystick, a camera, a voice recognition module, and/or other similar devices. User interface module 801 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 801 can also be configured to generate audible outputs, with devices such as a speaker, speaker jack, audio output port, audio output device, earphones, and/or other similar devices. User interface module 801 can further be configured with one or more haptic devices that can generate haptic outputs, such as vibrations and/or other outputs detectable by touch and/or physical contact with computing device 800. In some examples, user interface module 801 can be used to provide a graphical user interface (GUI) for utilizing computing device 800.

Network communications module 802 can include one or more devices that provide one or more wireless interfaces 807 and/or one or more wireline interfaces 808 that are configurable to communicate via a network. Wireless interface(s) 807 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interface(s) 808 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 802 can be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 803 can include one or more general purpose processors, and/or one or more special purpose processors (e.g., digital signal processors, graphics processing units, application specific integrated circuits, etc.). One or more processors 803 can be configured to execute computer-readable instructions 806 that are contained in data storage 804 and/or other instructions as described herein.

Data storage 804 can include one or more computer-readable storage media that can be read and/or accessed by at least one of one or more processors 803. The one or more computer-readable storage media can include volatile and/or non-volatile storage components, such as optical, magnetic, organic or other memory or disc storage, which can be integrated in whole or in part with at least one of one or more processors 803. In some examples, data storage 804 can be implemented using a single physical device (e.g., one optical, magnetic, organic or other memory or disc storage unit), while in other examples, data storage 804 can be implemented using two or more physical devices.

Data storage 804 can include computer-readable instructions 806 and perhaps additional data. In some examples, data storage 804 can include storage required to perform at least part of the herein-described methods, scenarios, and techniques and/or at least part of the functionality of the herein-described devices and networks. In some examples, data storage 804 can include storage stitching process(s) 812. In particular of these examples, computer-readable instructions 806 can include instructions that, when executed by one or more processors 803, enable computing device 800 to provide some or all of the functionality of stitching process(s) 812, which can provide the functionality of method 430 as described above.

In some examples, computing device 800 can include one or more sensors 820. Sensors 820 can be configured to measure conditions within computing device 800 and/or conditions in an environment of computing device 800 and provide data about these conditions. For example, sensors 820 can include one or more of: (i) sensors for obtaining data about computing device 800, such as, but not limited to, a thermometer measuring computing device 800's temperature, a battery sensor for measuring power of one or more batteries of power system 822, and/or other sensors measuring conditions of computing device 800; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 800, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 800, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 800, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 820 are possible as well.

Power system 822 can include one or more batteries 824 and/or one or more external power interfaces 826 for providing electrical power to computing device 800. Each battery of the one or more batteries 824 can, when electrically coupled to the computing device 800, act as a source of stored electrical power for computing device 800. One or more batteries 824 of power system 822 can be configured to be portable; e.g., readily transportable by a person carrying computing device 800 with the one or more batteries. Some or all of one or more batteries 824 can be readily removable from computing device 800. In other examples, some or all of one or more batteries 824 can be internal to computing device 800, and so may not be readily removable from computing device 800. Some or all of one or more batteries 824 can be rechargeable; for example, a rechargeable battery can be recharged via a wired connection between the battery and another power supply; e.g., one or more power supplies that are external to computing device 800 that are connected to computing device 800 via the one or more external power interfaces. In other examples, some or all of one or more batteries 824 can be non-rechargeable batteries.

One or more external power interfaces 826 of power system 822 can include one or more wired-power interfaces, such as a USB cable and/or a power cord, that enable wired electrical power connections to one or more power supplies that are external to computing device 800. One or more external power interfaces 826 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 826, computing device 800 can draw electrical power from the external power source the established electrical power connection. In some examples, power system 822 can include related sensors; e.g., battery sensors associated with the one or more batteries, electrical power sensors.

Example Methods of Operation

FIG. 9 is a flowchart of method 900, in accordance with some example embodiments. Method 900 can be executed by a computing device, such as computing device 800. Method 900 can begin at block 910, where the computing device can capture, substantially simultaneously, a first image with a first image sensor of a computing device and a second image with a second image sensor of the computing device, where the first image sensor is positioned on a first side of the computing device and is oriented at a first orientation with respect to an axis of rotation, and where the second image sensor is positioned on a second side of the computing device substantially opposite the first side of the computing device and is oriented at a second orientation that is axially rotated from the first orientation with respect to the axis of rotation, such as discussed above at least in the context of FIGS. 1, 4A-C, 5, and 6.

At block 920, the computing device can stitch, using the first image and the second image to create an output image that captures a 360 degree field of view with respect to the computing device, such as discussed above at in at least in the context of FIGS. 1, 4A-C, 5, and 6.

In some examples, the first image can contain one or more first gaps and one or more first overflow pixels, the second image can contain one or more second gaps and one or more second overflow pixels, and a processor of the computer device can stitch together the first image and the second image by moving a second overflow pixel of the one or more second overflow pixels into a first gap of the one or more first gaps and by moving a first overflow pixel of the one or more first overflow pixels into a second gap of the one or more second gaps, such as described in the context of FIGS. 4A-C and 5.

In some examples, at least of the first image sensor and the second image sensor have corresponding lenses with fields of view greater than 180 degrees In some examples, one or more pixels from the first image overlap with one or more pixels from the second image, and the stitching can comprise identifying a first overlapping pixel in the first image and a second overlapping pixel in the second image, where both the first overlapping pixel and the second overlapping pixel are eligible to be used as a particular output pixel of the output image, and selecting either the first overlapping pixel or the second overlapping pixel as the particular output pixel of the output image, such as discussed above at least in the context of FIGS. 4A-C and 5.

In some examples, the first image sensor and the second image sensor comprise rectangular image sensors, such as discussed above at least in the context of FIGS. 4A-C, 5 and 6.

In some examples, the second orientation is rotated substantially 90 degrees from the first orientation with respect to the axis of rotation, such as discussed above at least in the context of FIGS. 4A-C and 6.

In some examples, both the first image sensor and the second image sensor have an aspect ratio of substantially 4:3, such as discussed above at least in the context of FIGS. 4A-C and 6

In some examples, both the first image sensor and the second image sensor have an aspect ratio of substantially 1:1, such as discussed above at least in the context of FIGS. 5 and 6.

In some examples, the second orientation is rotated substantially 45 degrees from the first orientation with respect to the axis of rotation, such as discussed above at least in the context of FIGS. 5 and 6.

In some examples, the computing device can have a processor that is configured to output at least one of the first image, the second image, and the output image, such as discussed above at least in the context of FIGS. 1, 4A-C, 5 and 6.

What is claimed is:

1. A device, comprising:
   a first image sensor with a first focal point aligned along an axis of rotation, the first image sensor oriented at a first orientation with respect to the axis of rotation;
   a second image sensor with a second focal point aligned along the axis of rotation, the second image sensor oriented at a second orientation that is axially rotated from the first orientation with respect to the axis of rotation with both the first focal point and the second focal point remaining aligned along the axis of rotation, the first image sensor and the second image sensor having a rectangular shape; and
   a processor configured to:
      capture a first image of a scene with the first image sensor and a second image of the scene with the second image sensor, the first image being adjacent to a region of the scene uncaptured by the first image sensor, the second image including a pixel, and
      combine the first image and the second image by moving the pixel of the second image into the region of the first image to create an output image that captures a field of view with respect to the device.

2. The device of claim 1, wherein at least one of the first image sensor and the second image sensor have corresponding lenses with fields of view greater than 180 degrees.

3. The device of claim 1, wherein one or more pixels from the first image overlap with one or more pixels from the second image, and wherein the processor configured to combine the first image and the second image is further configured to:
   identify a first overlapping pixel in the first image and a second overlapping pixel in the second image, wherein both the first overlapping pixel and the second overlapping pixel are eligible to be used as a particular output pixel of the output image, and
   select either the first overlapping pixel or the second overlapping pixel as the particular output pixel of the output image.

4. The device of claim 1, wherein the second orientation is rotated substantially 90 degrees from the first orientation with respect to the axis of rotation.

5. The device of claim 1, wherein both the first image sensor and the second image sensor have an aspect ratio of substantially 4:3.

6. The device of claim 1, wherein both the first image sensor and the second image sensor have an aspect ratio of substantially 1:1.

7. The device of claim 1, wherein the second orientation is rotated substantially 45 degrees from the first orientation with respect to the axis of rotation.

8. The device of claim 1, wherein the processor is configured to output at least one of the first image, the second image, and the output image.

9. A method, comprising:
   capturing a first image of a scene with a first image sensor of a computing device and a second image of the scene with a second image sensor of the computing device, the first image being adjacent to a region of the scene uncaptured by the first image sensor, the second image including a pixel, wherein:
      the first image sensor includes a first focal point aligned along an axis of rotation and the first image sensor is oriented at a first orientation with respect to the axis of rotation, and
      the second image sensor includes a second focal point aligned along the axis of rotation and the second image sensor is oriented at a second orientation that is axially rotated from the first orientation with respect to the axis of rotation with both the first focal point and the second focal point remaining aligned along the axis of rotation, the first image sensor and the second image sensor having a rectangular shape; and
   combining, using the computing device, the first image and the second image by moving the pixel of the second image into the region of the first image to create an output image that captures a field of view with respect to the computing device.

10. The method of claim 9, wherein at least one of the first image sensor and the second image sensor have corresponding lenses with fields of view greater than 180 degrees.

11. The method of claim 9, wherein one or more pixels from the first image overlap with one or more pixels from the second image, and wherein combining includes:
   identifying a first overlapping pixel in the first image and a second overlapping pixel in the second image, wherein both the first overlapping pixel and the second overlapping pixel are eligible to be used as a particular output pixel of the output image, and selecting either the first overlapping pixel or the second overlapping pixel as the particular output pixel of the output image.

12. The method of claim 9, wherein the second orientation is rotated substantially 90 degrees from the first orientation with respect to the axis of rotation.

13. The method of claim 9, wherein both the first image sensor and the second image sensor have an aspect ratio of substantially 4:3.

14. The method of claim 9, wherein both the first image sensor and the second image sensor have an aspect ratio of substantially 1:1.

15. The method of claim 9, wherein the second orientation is rotated substantially 45 degrees from the first orientation with respect to the axis of rotation.

16. The method of claim 9, wherein the computing device is configured to output at least one of the first image, the second image, and the output image.

\* \* \* \* \*